(12) United States Patent
Schechner et al.

(10) Patent No.: US 12,281,848 B2
(45) Date of Patent: Apr. 22, 2025

(54) HEAT EXCHANGER ARRANGEMENT

(71) Applicant: Envola GmbH, Ulm (DE)

(72) Inventors: Alexander Schechner, Ulm (DE); Gerhard Ihle, Ulm (DE)

(73) Assignee: Envola GmbH, Ulm (DE)

( * ) Notice: Subject to any disclaimer, the term of this patent is extended or adjusted under 35 U.S.C. 154(b) by 173 days.

(21) Appl. No.: 17/913,966

(22) PCT Filed: Mar. 25, 2021

(86) PCT No.: PCT/EP2021/057787
§ 371 (c)(1),
(2) Date: Sep. 23, 2022

(87) PCT Pub. No.: WO2021/191371
PCT Pub. Date: Sep. 30, 2021

(65) Prior Publication Data
US 2023/0121916 A1    Apr. 20, 2023

(30) Foreign Application Priority Data

Mar. 26, 2020  (DE) .................... 10 2020 108 377.7
Sep. 25, 2020  (DE) .................... 10 2020 125 030.4

(51) Int. Cl.
*F28D 11/00*   (2006.01)
*F04D 17/02*   (2006.01)
*F04D 29/58*   (2006.01)
*F28D 1/02*    (2006.01)

(52) U.S. Cl.
CPC ............ *F28D 1/024* (2013.01); *F04D 17/02* (2013.01); *F04D 29/582* (2013.01)

(58) Field of Classification Search
CPC ......... F28D 1/024; F04D 17/02; F04D 29/582
USPC ........................................................ 165/86
See application file for complete search history.

(56) References Cited

U.S. PATENT DOCUMENTS

| 2,944,801 A | 7/1960 | Katz et al. |
| 8,087,905 B2 | 1/2012 | Wysk et al. |
| 2018/0112930 A1 | 4/2018 | Schechner et al. |
| 2018/0356163 A1 | 12/2018 | Schechner et al. |

FOREIGN PATENT DOCUMENTS

| DE | 838188 C | 5/1952 |
| DE | 29 26 610 A1 | 1/1981 |
| DE | 3905278 A1 * | 9/1989 |
| DE | 10 2007 003 568 B4 | 8/2012 |

(Continued)

OTHER PUBLICATIONS

International Search Report in PCT/EP2021/057787, mailed Jun. 9, 2021.

*Primary Examiner* — Davis D Hwu
(74) *Attorney, Agent, or Firm* — Collard & Roe, P.C.

(57) ABSTRACT

A heat exchanger arrangement includes a housing in which an air inlet opening is arranged on the circumference, a cover that covers the housing on an upper side and in which an air outlet opening is arranged, a reverse-operated radial fan being arranged inside the housing in such a way that it can generate an air flow between the air inlet opening and the air outlet opening, which air flow is directed radially inward with respect to the axis of rotation of the radial fan and which flows through at least one air heat exchanger arranged in the housing.

9 Claims, 7 Drawing Sheets

(56) References Cited

FOREIGN PATENT DOCUMENTS

Figure 1:
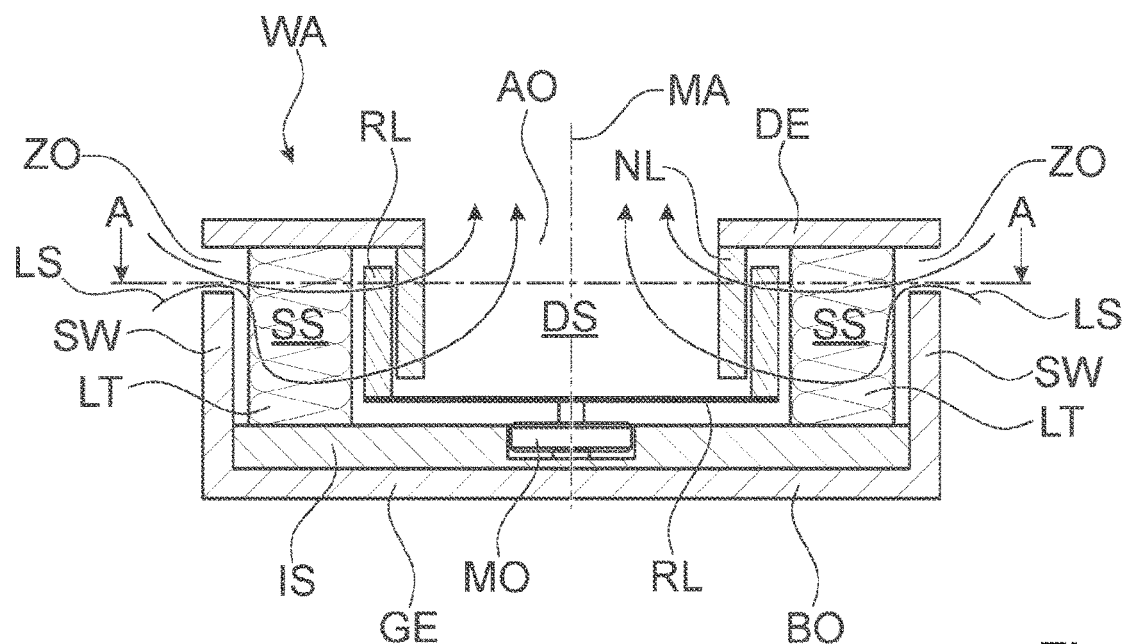

| | | |
|---|---|---|
| DE | 10 2015 104 909 B3 | 9/2016 |
| DE | 10 2015 121 177 A1 | 6/2017 |
| DE | 10 2017 102 303 A1 | 8/2017 |
| JP | S55-155125 A | 12/1980 |
| JP | H09-303853 A | 11/1997 |
| JP | 3898183 B2 * | 3/2007 |
| WO | 2005/096715 A2 | 10/2005 |

* cited by examiner

HEAT EXCHANGER ARRANGEMENT

CROSS REFERENCE TO RELATED APPLICATIONS

This application is the National Stage of PCT/EP2021/057787 filed on Mar. 25, 2021, which claims priority under 35 U.S.C. § 119 of German Application No. 10 2020 108 377.7 filed on Mar. 26, 2020 and German Application No. 10 2020 125 030.4 filed on Sep. 25, 2020, the disclosures of which are incorporated by reference. The international application under PCT article 21(2) was not published in English.

The invention relates to a heat exchanger arrangement.

The use of fossil fuels is not only increasingly uneconomical, but is also increasingly being questioned due to the associated negative effects on the climate. In addition to an increase in the use of renewable energy sources, efficient systems for energy storage are therefore also required that, in combination with intelligent controls, can ensure reduced energy consumption, for example when heating or cooling buildings or systems. Due to such measures, a high potential for savings can be created regardless of the energy source used, which also compensates for the associated installation costs.

DE 29 26 610 A1 discloses a store for providing the input thermal energy at a low temperature level for heat pump systems, which absorb this energy and release it again at a higher temperature level. A water basin is designed in such a way that the water content thereof can freeze without damaging the basin and that a heat exchanger system located on the bottom of the basin or embedded in the bottom of the basin allows the cooling and freezing heat of this basin to be fed to the cold side of a heat pump.

In addition to using an artificial water basin, using natural bodies of water as a storage medium is also known.

For example, DE 10 2015 104 909 A1 discloses an energy store that has a heat exchanger that is arranged so as to float on a lower basin designed as a lake, which lower basin can preferably be filled with water via a first supply line, wherein, in separate circuits, water from the lower basin can be supplied to a heat pump via a second supply line, and coolant penetrating the heat exchanger can be supplied to said heat pump via a third supply line so that energy can be removed from the water of the lower basin via the heat exchanger by freezing the water in the lower basin or in the form of sensible heat and forwarded to a consumer for heating and/or cooling.

Furthermore, DE 10 2015 121 177 A1 discloses a floating device for introducing thermal energy into a body of water and for extracting thermal energy from the body of water, which floating device has a water heat exchanger that is immersed in the body of water after the device has been placed in the body of water and a has an inlet and an outlet for a heat transfer fluid that can deliver thermal energy to the body of water or remove heat energy from the body of water. The device also has an air heat exchanger that can be penetrated by ambient air and also has an inlet for water originating from the body of water and a corresponding outlet so that water can flow from the body of water through the air heat exchanger, it being possible to transfer thermal energy between the ambient air flowing through the air heat exchanger and the water flowing through the air heat exchanger.

The devices described above usually interact with a heat pump installed in a building. Said heat pump can be supplied with electrical energy, for example, via the power grid or its own power storage system.

WO 2005/096715 A2 discloses a heat exchanger arrangement in which a radial fan is arranged above a heat exchanger for forward operation so that the supply air is transported through the heat exchanger to the suction side in the radial fan and then transported via the pressure side to an air outlet opening.

DE 10 2007 003 568 B4 discloses a fan arrangement having a radial fan, the radial fan drawing in air along its central axis in forward operation and discharging it via an outside guide arrangement.

DE 10 2017 102 303 A1 discloses a device for heat recovery that comprises a heat exchanger that is arranged in a housing that is sunk into the ground and that has an air inlet and an air outlet, between which an air flow generated by means of a fan flows. The heat exchanger is arranged in the underground housing to avoid disturbing noise emissions. The underground housing is arranged within an excavation that is filled with a drainage material such as gravel.

In particular, the document last cited refers to the requirements with regard to the fan noise that is generated.

Because, despite the measures mentioned above, the background noise from heat exchanger arrangements, in particular due to the acoustic emissions from the fans, is above the threshold of perception for most people, the object is to provide a heat exchanger arrangement whose acoustic emissions are reduced even further.

This object is achieved by the features of claim 1. Further advantageous embodiments of the invention are the subject matter of the dependent claims. These can be combined in a technologically meaningful manner. The description, in particular in connection with the drawing, additionally characterizes and specifies the invention. According to the invention, a heat exchanger arrangement is provided that comprises a housing in which at least one air inlet opening is arranged on the circumference, a cover that covers the housing on an upper side and in which at least one air outlet opening is arranged, a reverse-operated radial fan being arranged inside the housing in such a way that it can generate an air flow between the air inlet opening and the air outlet opening, which air flow is directed radially inward with respect to the axis of rotation of said radial fan and which flows through at least one air heat exchanger arranged in the housing.

Surprisingly, it has been shown that a reverse-running radial fan is suitable for providing the desired ventilation performance with minimal acoustic emissions. Radial fans having a radially outward air flow are usually used in forward operation, the air being drawn in toward the axis of rotation. An axial fan is typically used for radial outflow. The advantage of the reverse-running radial fan compared to an axial fan is that the reverse-running radial fan can be operated at a low speed so that there are almost no perceptible acoustic emissions when the fan is running. Reverse-running is understood to mean that the suction side of the radial fan is outside the blades with respect to its axis of rotation, whereas the pressure side is inside the radial fan with respect to the axis of rotation. An air flow is therefore generated by the radial fan in reverse operation from the outside suction side to the inside pressure side.

The air heat exchanger is arranged within a housing, the housing having, with respect to a central axis, an air inlet opening on the outside and an air outlet opening on the inside, between which a horizontal air flow is generated by means of the radial fan, which horizontal air flow flows through the air heat exchanger or flows past the fins of the air heat exchanger in the usual manner. The terms "inside" and "outside" refer to directions starting from the axis of rotation of the radial fan, a component that is closer to the axis of rotation being referred to as being on the inside. The central axis does not have to be the geometric center of the housing, rather the central axis is to be understood as a reference point inside the housing around which, proceeding from the inside to the outside, the radial fan is first arranged, then the air heat exchanger further outside and then the air inlet opening further outside. Usually, but not necessarily, the axis of rotation and the central axis lie on top of each other. The air outlet opening is arranged above the pressure side of the radial fan so that the air flow generated horizontally on the suction side can exit the housing in the vertical direction on the pressure side. The heat exchanger arrangement is usually arranged in such a way that the axis of rotation of the radial fan is aligned perpendicular to the ground. Compared to the axial fans usually used, a radial fan in reverse operation has the advantage that it can be designed with a larger diameter so that high air volumes can be moved at low speeds and low air flow rates. The radial fan is advantageously enclosed upward and downward in the housing in the direction of its axis of rotation. The enclosure can also be part of the housing or other components of the heat exchanger arrangement. The maximum air flow that can be transported can be specified accordingly by selecting the dimensions of the radial fan. During operation of the heat exchanger arrangement, a carrier medium is pumped through the heat exchanger arrangement by an external heat pump and the radial fan is operated in reverse. Ambient air is drawn into the housing through the air inlet openings, then guided radially through the air ducts of the fins of the air heat exchanger to the radial fan, then transported through the radial fan to the pressure side and finally axially discharged from the housing through the air outlet opening. The air heat exchanger can either be arranged circumferentially around the radial fan or it can comprise individual blocks that are arranged around the radial fan. The air inlet openings are arranged and dimensioned in such a way that ambient air can flow through the air heat exchanger.

According to one embodiment, the radial fan has a plurality of blades that are surrounded by a guide arrangement having a plurality of fins.

Accordingly, a guide arrangement is arranged inside the radial fan, which guide arrangement has fins that guide the air flow on the pressure side of the radial fan toward the axis of rotation of the radial fan and/or in the direction of the air outlet openings. Surprisingly, it has been shown that the acoustic emission of the heat exchanger arrangement can be still further reduced by means of the guide arrangement. Overall, it was possible to further reduce acoustic emissions by using a reverse running radial fan and an inside guide arrangement while having comparable fan performance.

According to a further embodiment, the blades of the radial fan and the fins of the guide arrangement are curved in opposite directions.

The fact that the fins and the blades are curved differently means that the air is diverted at the blades of the radial fan. The air flow coming from the radial fan is taken off by the guide arrangement and guided in the direction of the air outlet opening or guided to the center of the guide arrangement, which center ideally coincides with the axis of rotation of the radial fan so that an overpressure is created there, which overpressure escapes through the air outlet opening. It is particularly advantageous if the blades of the radial fan are curved forward relative to the reverse operation and the fins of the guide arrangement are curved backward.

According to a further embodiment of the invention, the blades of the radial fan and/or the fins of the guide arrangement are formed with a constant curvature along and parallel to their vertical axis.

Each blade or fin thus has a circle center offset parallel to its vertical axis, around which circle center the blade is formed with a constant radius and thus with a constant curvature. Alternatively, the blades or fins could also have a non-constant curvature, in particular such that the curvature decreases toward the axis of rotation. The radial fan is thus advantageously of cylindrical design so that the vertical axes of the blades are arranged parallel to one another and parallel to the axis of rotation, the axis of rotation at the same time being aligned substantially parallel to the central axis of the housing. The central axis of the housing is perpendicular to the cover of the housing. The guide arrangement advantageously also has a cylindrical shape in which the vertical axes of the fins are aligned parallel to one another and parallel to the axis of rotation of the radial fan.

According to a further embodiment of the invention, inwardly tapering regions are formed between the fins (LA) so that the air flow experiences an inward pressure increase.

Due to this configuration, the pressure of the air flow increases in the interior so that sufficient flow through the air heat exchanger is possible even at low speeds when the radial fan is operating in reverse. A plurality of blades push the air radially inwards. Because there is an increase in pressure in the tapering region, the air will escape axially without being set in rotational motion.

According to a further embodiment of the invention, the air inlet opening is arranged between the cover and the housing.

Accordingly, the air inlet openings are aligned horizontally with respect to the central axis of the housing. This has the advantage that thermal short circuits between the exhaust air and the supply air can be avoided or reduced. In addition, such an arrangement is suitable for use with a system for energy storage, as will be described further below.

However, the air inlet openings can also be arranged in a sidewall of the housing. Such an arrangement is advantageous in particular when using a free-standing air heat exchanger that, after assembly, is surrounded by the housing as an enclosure. The sidewall of the housing can be perforated with holes in the region of the air heat exchanger so that air can flow through the air heat exchanger in a particularly advantageous manner.

According to a further embodiment of the invention, the reverse-operated radial fan and the guide arrangement cover at least in portions along the axis of rotation of the radial fan.

Accordingly, the air inlet openings of the air heat exchangers of the radial fans and the guide arrangement are located one above the other at least along a common radial ray around the central axis. Air flowing horizontally from the air inlet opening to the pressure side of the radial fan thus runs past the air heat exchanger, the radial fan and the guide arrangement.

According to a further embodiment of the invention, the reverse-operated radial fan is driven by means of an electric motor.

The required air flow can easily be varied by using an electric motor. The electric motor can be arranged in an insulating layer in order to largely absorb noises emanating from the motor within the housing.

It is advantageous to use the heat exchanger arrangement together with a water reservoir. Such a system for storing energy and for exchanging heat comprises an aforementioned heat exchanger arrangement, a water reservoir for storing heat, a water heat exchanger protruding into the water reservoir and a heat pump that can convey a medium for heat exchange between the air heat exchanger of the heat exchanger arrangement and/or the water heat exchanger so that heat can be exchanged, it being possible for the water reservoir to be sunk into a hole in the ground and for the heat exchanger arrangement to be arranged in the direction of the central axis of the housing on the water reservoir in such a way that at least the air inlet openings protrude above the ground.

Accordingly, one of the aforementioned heat exchanger arrangements is combined with an energy store. The energy store stores heat inside a water reservoir or can release heat from a heat pump into the water reservoir. The operation of the water heat exchanger, the heat exchanger arrangement and the heat pump is regulated by a control device. The water reservoir and the heat exchanger arrangement can comprise a common housing.

Figure 2:
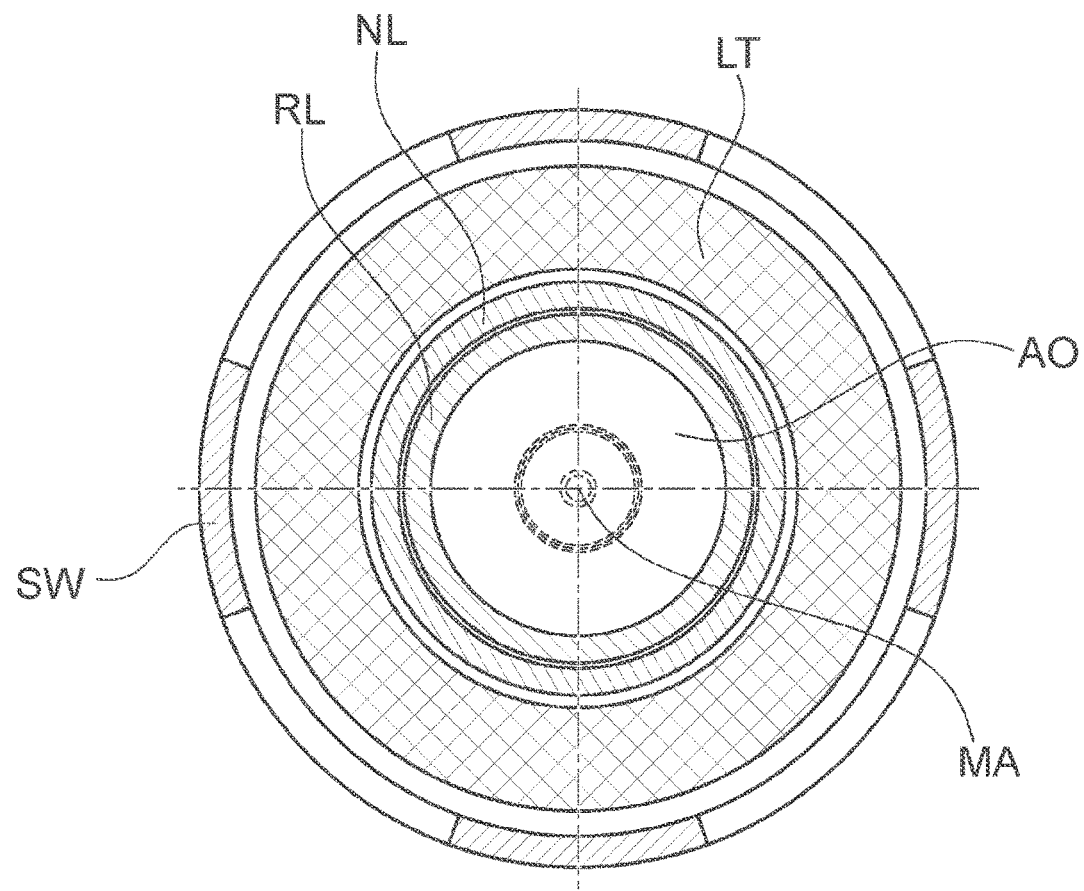
Figure 3:
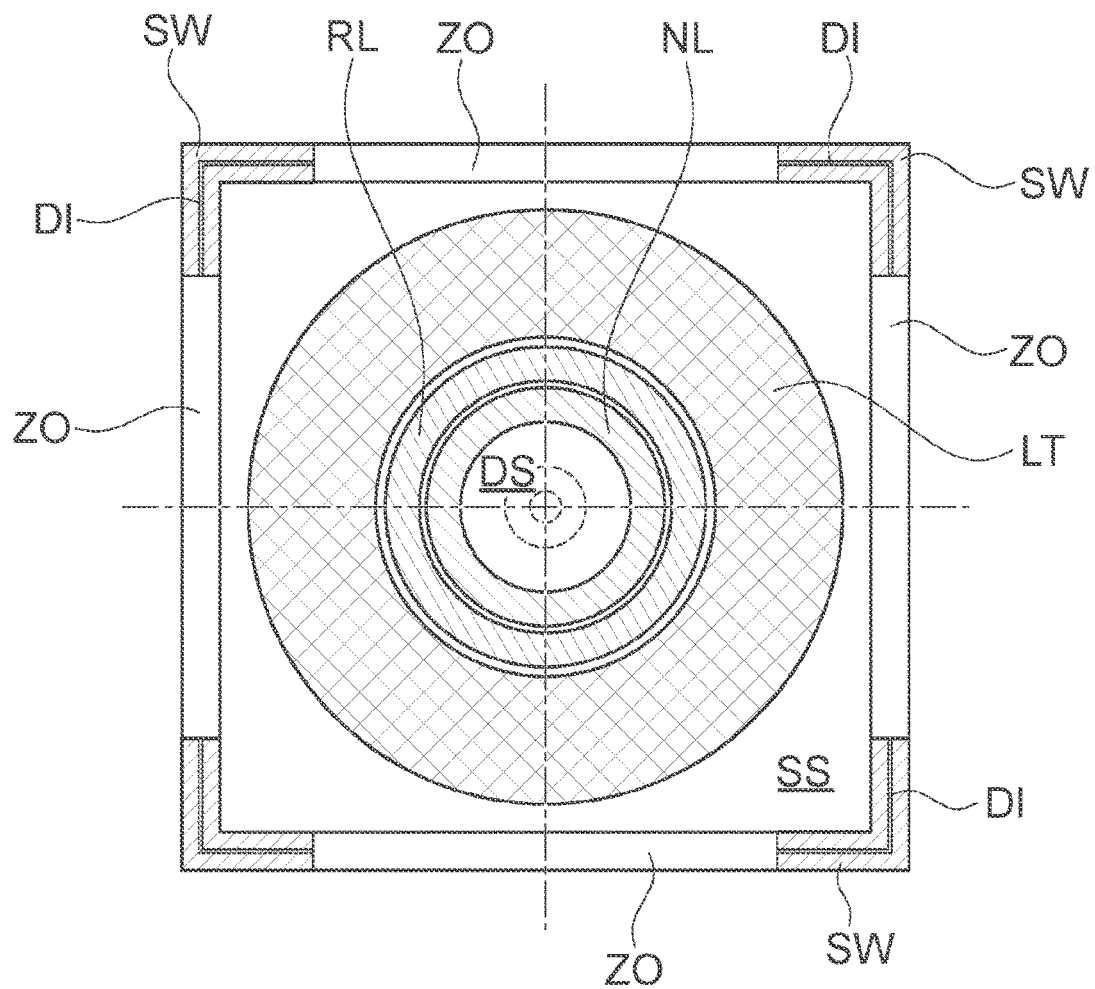
Figure 4:
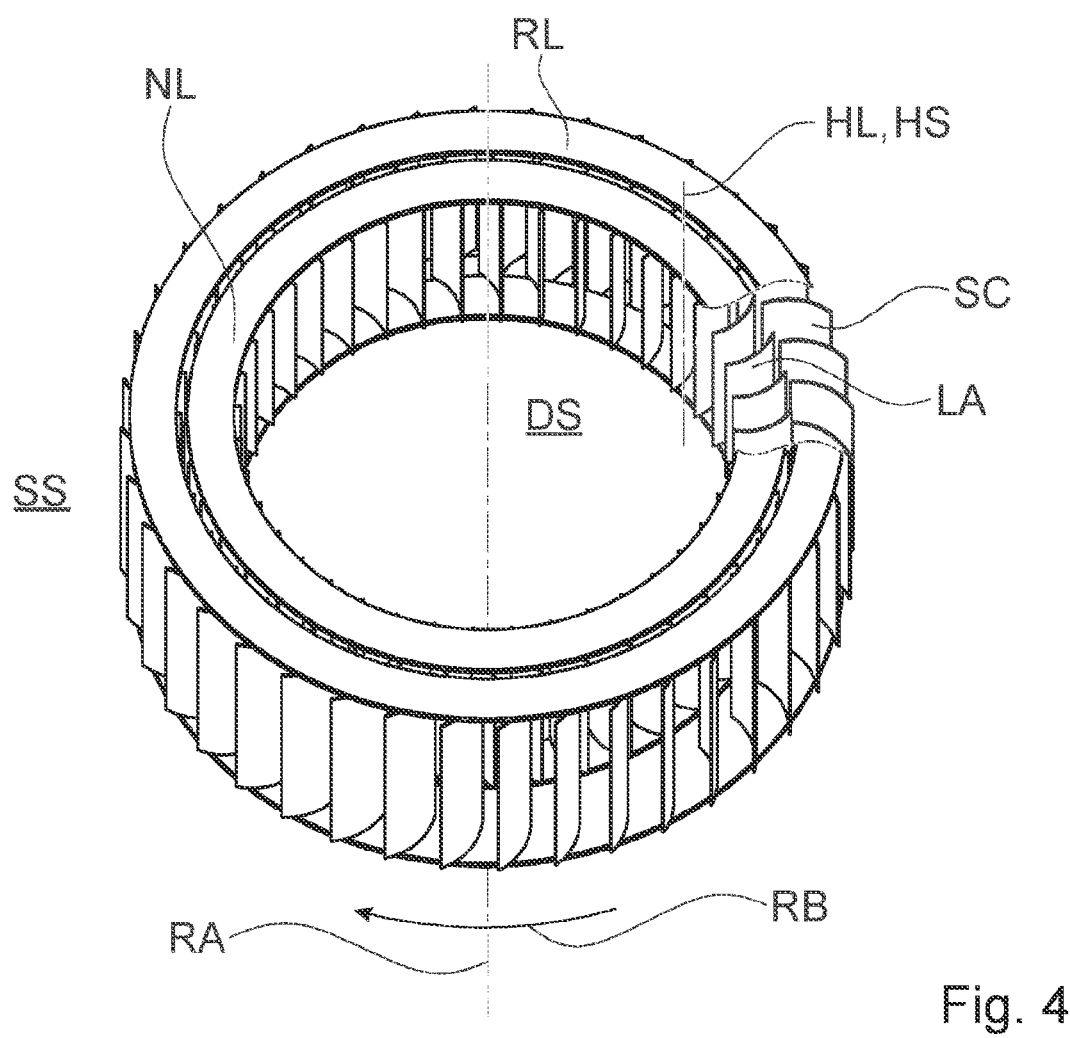
Figure 5:
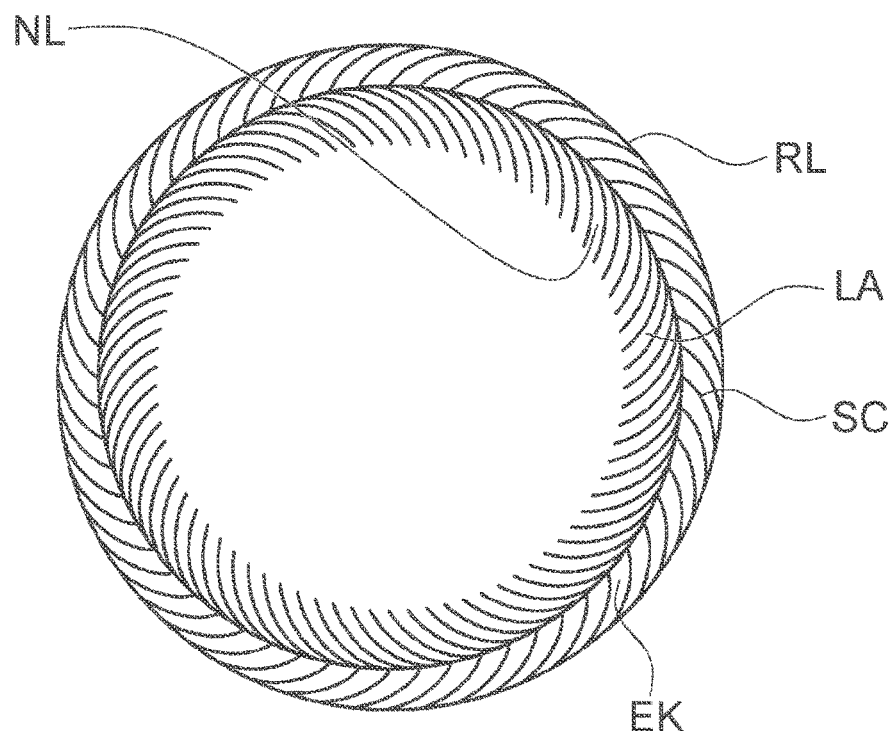
Figure 6:
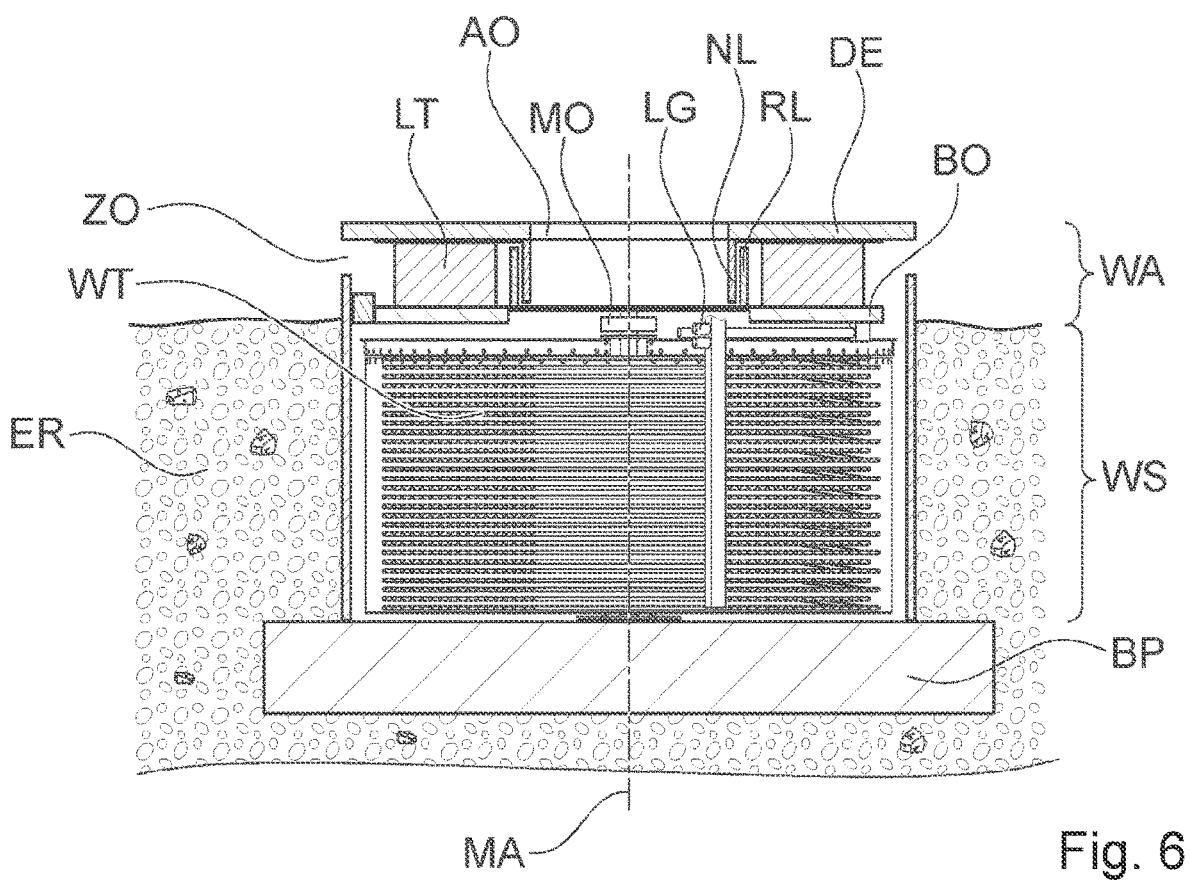
Figure 7:
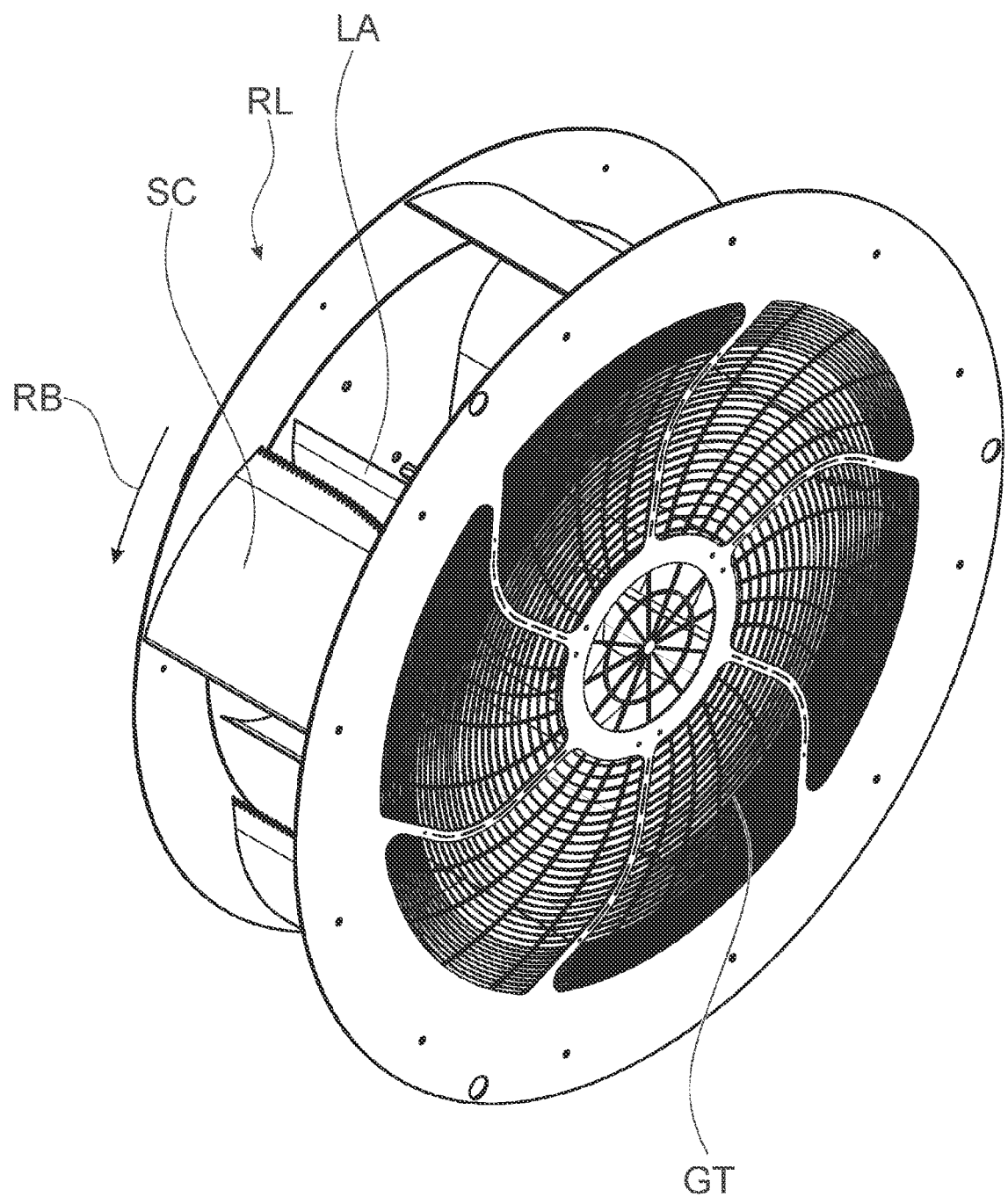
Figure 8:
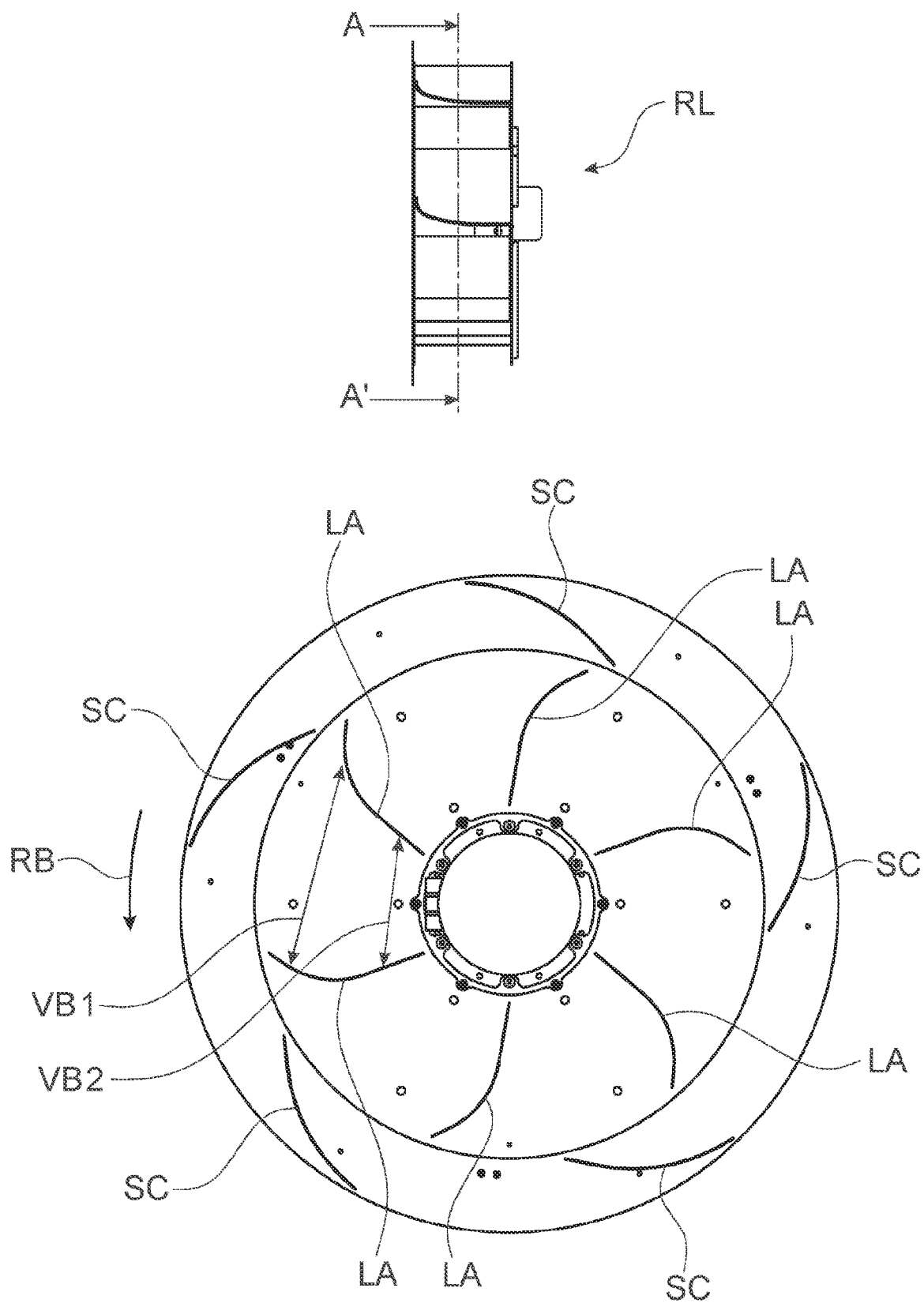
Figure 9:
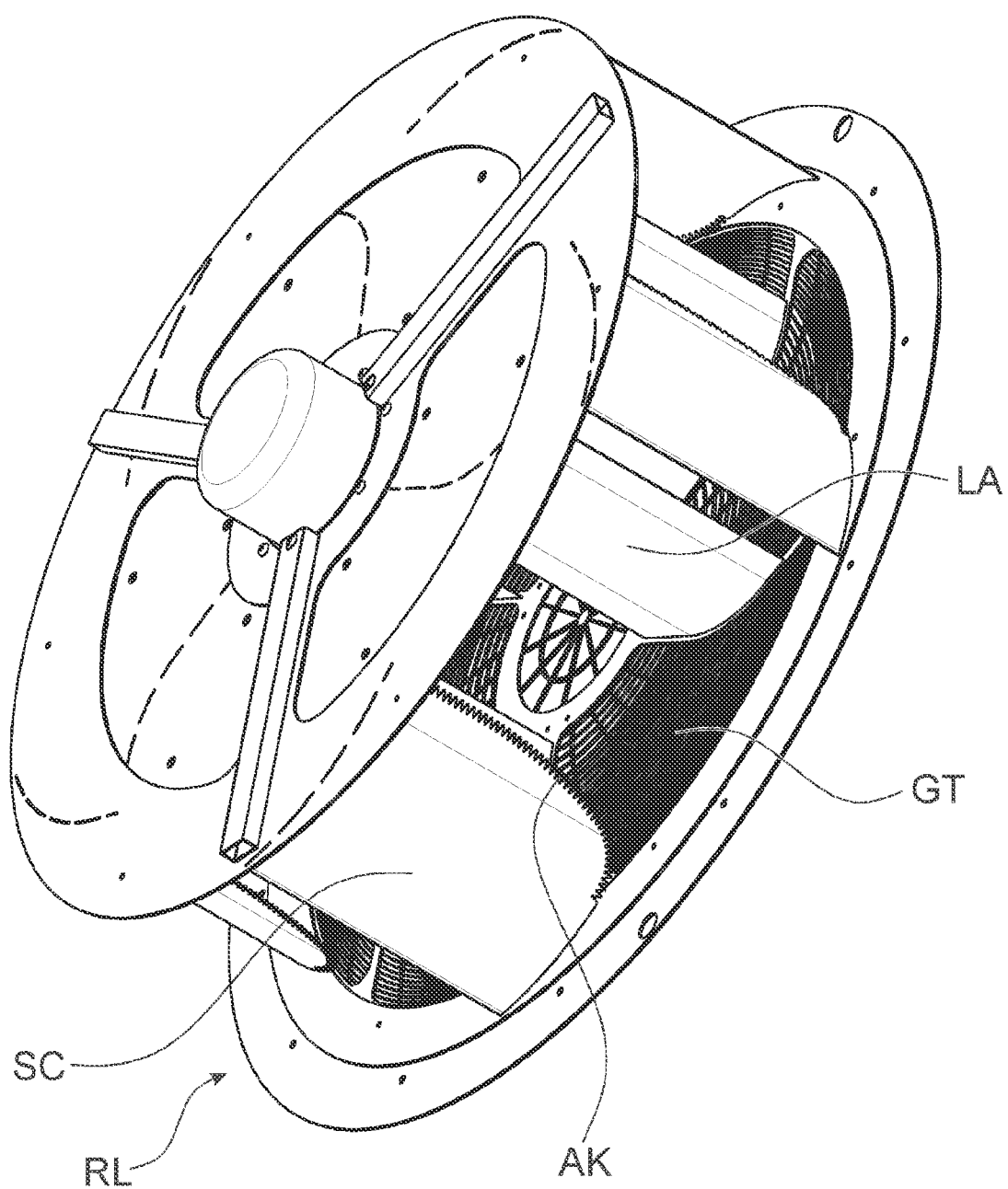

Some embodiments are explained in more detail below with reference to the drawings. In the drawings:

FIG. 1 shows a first embodiment of the heat exchanger arrangement in a sectional side view, FIG. 2 shows the heat exchanger arrangement of FIG. 1 in a sectional plan view through the central axis, FIG. 3 shows a further embodiment of the heat exchanger arrangement in a sectional plan view through the central axis, FIG. 4 shows a radial fan having a guide arrangement according to a first embodiment in a partially sectional perspective view, FIG. 5 shows the radial fan having a guide arrangement from FIG. 4 in a cross-sectional view, FIG. 6 shows a system for energy storage in a sectional side view, FIG. 7 shows a radial fan according to a second embodiment in a perspective view, FIG. 8 shows the radial fan from FIG. 7 in a cross-sectional view, and FIG. 9 shows the radial fan from FIG. 7 in a further perspective view.

In the figures, the same or functionally equivalent components are provided with the same reference signs.

A first embodiment of a heat exchanger arrangement WA according to the invention is described below with reference to FIG. 1. The heat exchanger arrangement comprises a housing GE having air inlet openings ZO and, relative to the air inlet openings ZO, air outlet openings AO on the inside, the terms "on the inside" and "on the outside" being used with respect to a central axis MA that is normally located on a cover DE of the housing and penetrates the housing.

Starting from the air inlet openings ZO on the inside, an air heat exchanger LT is arranged. A radial fan RL is arranged even further inside, to which a downstream guide arrangement NL is connected on the inside. The radial fan RL is driven in reverse operation by means of an electric motor MO so that an air flow LS flows from the air inlet openings ZO through the air heat exchanger LT, the radial fan RL and the guide arrangement NL to the air outlet opening AO. Accordingly, the air heat exchanger LT is located on a suction side SS of the radial fan RL, whereas the guide arrangement NL and the air outlet opening AO are located on the pressure side DS of the radial fan RL. The electric motor MO is arranged inside an insulation layer IS for acoustic and/or thermal insulation.

The air flow LS traverses the housing GE largely horizontally from the air inlet openings ZO, but exits the housing GE vertically through the air outlet opening AO. In the case of forward operation of the radial fan RL, as is generally considered normal, the direction of flow would be reversed. Thus, in forward operation, air coming from the axis of rotation RA of the radial fan RL would be conveyed horizontally outward to the air inlet openings ZO. A carrier medium is pumped to the air heat exchanger LT by a heat pump (not shown). Heat is then exchanged between the ambient air and the carrier medium in air ducts LK of the air heat exchanger LT.

FIG. 2 shows a sectional plan view of the heat exchanger arrangement from FIG. 1 along the axis AA. From the outside inward, the heat exchanger arrangement WA comprises a housing GE having sidewalls SW, an air heat exchanger LT, a radial fan RL, a guide arrangement NL, an air outlet opening AO. A central axis MA of the housing GE runs through the center of the heat exchanger arrangement. The central axis MA does not necessarily run through the geometric center of the housing GE, but usually coincides with the axis of rotation of the radial fan RL and forms the reference point for the arrangement of all other components. The guide arrangement NL is designed as a stator around which the radial fan RL rotates.

FIG. 3 shows an alternative embodiment of the heat exchanger arrangement WA in which the housing GE has a rectangular cross section. The air heat exchanger LT is in turn arranged between the air inlet openings ZO and the air outlet opening AO. The air heat exchanger LT is located on the suction side SS of the reverse-operated radial fan, whereas the guide arrangement NL is arranged on the pressure side DS of the radial fan RL. The air heat exchangers LT correspond in their dimensions to the air inlet openings ZO. Seals DI can optionally be arranged along the contact surfaces of the cover DE on the sidewalls SW of the housing GE, which seals prevent air from being sucked in through the gaps between the cover DE and the sidewalls SW. Such an arrangement is in particular advantageous when using a free-standing heat exchanger arrangement WA that is to be surrounded by the housing GE as an enclosure after assembly in order to protect it from damage.

FIG. 4 shows the radial fan RL and the guide arrangement NL in a perspective view, parts of the representation being in section. The radial fan RL has blades SC that are curved forward and whose vertical blade axis HS runs parallel to the axis of rotation RA of the radial fan RL. The guide arrangement NL has fins LA that are arranged so as to be curved backward with respect to the direction of rotation in reverse operation RB and whose fin vertical axis HL also run parallel to the axis of rotation RA of the radial fan RL. Due to the reverse operation RB, the pressure side DS is on the inside, while the suction side SS is on the outside. During reverse operation RB, air is drawn in by the blades SC on the suction side SS and pushed toward the pressure side DS. The guide arrangement picks up the air flow generated by the radial fan RL on the pressure side DS and directs it in the direction of the axis of rotation RA.

FIG. 5 shows the arrangement of the radial fan RL together with the guide arrangement NL in a sectional view perpendicular to the axis of rotation RA, which would be perpendicular to the plane of the sheet in the selected representation. It can be seen that the fins LA of the guide arrangement NL and the blades SC of the radial fan RL are designed in such a way that an expansion channel EK is formed between adjacent partitions, which expansion channel causes a pressure change between the suction side and the pressure side. Due to this configuration, the speed of the air flow is converted to change the pressure of the air flow so that sufficient flow through the air heat exchanger is possible even at low speeds when the radial fan RL is operating in reverse. The reverse operation of the radial fan RL is particularly well suited for use with the air heat exchangers presented here because the lateral inflow of air via the air inlet openings ZO and the upward outflow of the air flow through the air outlet openings AO complement each other perfectly with a reverse-operated radial fan. The combination of the air heat exchanger LT with another heat exchanger that is placed in a liquid is particularly advantageous. Such a system is presented in more detail below.

A system for storing energy is shown in FIG. 6, which system comprises a heat exchanger arrangement WA and a water reservoir WS for storing heat. A water heat exchanger WT is arranged in the water reservoir WS. A transport medium used for heat exchange can be pumped through the water heat exchanger WT or the air heat exchanger LT of the heat exchanger arrangement WA by means of a heat pump (not shown). The transport medium is pumped from the heat pump into the lines LG, which lead to the air heat exchanger LT and the water heat exchanger WT. The heat exchanger arrangement WA is arranged above the water reservoir WS with respect to the central axis MA of the housing GE. The water reservoir WS is arranged inside a hole in the ground ER, the air inlet openings ZO of the heat exchanger arrangement WA protruding above the ground.

A further embodiment of a radial fan RL is shown in a perspective view in FIG. 7. The radial fan RL has a grate GT on its upper side that corresponds to the outlet opening AO shown in FIG. 1. The radial fan RL in turn has a plurality of blades SC that can be set in a rotational motion in reverse operation RB as shown. A plurality of fins LA are located in the interior. The rotational movement of the blades SC in turn brings air radially from the outside into the inside of the arrangement so that the air can escape in the axial direction via the grate GT. In contrast to the embodiment according to FIG. 4, however, a significantly smaller number of blades SC and fins LA is provided here.

The mode of operation of the radial fan RL can be better explained with reference to FIG. 8. FIG. 8 shows a cross-sectional view through the section plane A-A' of the radial fan RL as shown. It can be seen that, in reverse operation, a plurality of blades SC push air radially inward. A tapering region forms between the fins LA, as indicated by the distances VB1 and VB2 between two adjacent fins LA. Because there is an increase in pressure in the tapering region, the air will escape axially upward through the grate GT without being set in rotational motion. In this way, low-noise fan operation can be generated in which, as is the case for an air heat exchanger LT according to FIG. 1, it is advantageous to achieve an airflow radially inward and axially upward between the suction side and the pressure side.

FIG. 9 shows the radial fan RL again in a further perspective view. It can be seen that the inside breakaway edge AK of the blade SC of the radial fan RL has a structured design, for example serrated. This results in further noise reduction. Furthermore, the breakaway edge AK is curved toward the grate GT such that the region from which the air exits is not additionally covered by the blade SC. In this way, the size of the outlet opening is optimized across the grate GT. With the measures shown, a suitably large air flow rate can be guided through the air heat exchanger LT and very low-noise or almost no-noise operation can be achieved. The last aspect in particular is desirable when a heat exchanger arrangement WA is used, for example, in private households or in offices.

The features indicated above and in the claims, as well as the features which can be seen in the figures, may be advantageously implemented both individually as well as in various combinations. The invention is not limited to the embodiments described, but may be modified in many ways within the capabilities of a person skilled in the art.

The invention claimed is:
1. A heat exchanger arrangement (WA) comprising
   a housing (GE) in which an air inlet opening (ZO) is arranged on the circumference,
   a cover (DE) that covers the housing (GE) on an upper side and in which an air outlet opening (AO) is arranged,
   a reverse-operated radial fan (RL) being arranged inside the housing (GE) in such a way that it can generate an air flow between the air inlet opening (ZO) and the air outlet opening (AO), which air flow is directed radially inward with respect to the axis of rotation (RA) of said reverse-operated radial fan and which flows through at least one air heat exchanger (LT) arranged in the housing (GE),
   wherein the air inlet opening (ZO) is arranged between the cover (DE) and the housing (GE), and
   wherein the air flow generated by the reverse-operated radial fan flows upward through the air outlet opening (AO).
2. The heat exchanger arrangement according to claim 1, wherein the radial fan (RL) has a plurality of blades (SC) that are surrounded by a guide arrangement (NL) having a plurality of fins (LA).
3. The heat exchanger arrangement according to claim 1, wherein the blades (SC) of the radial fan (RL) and the fins (LA) of the guide arrangement (NL) are curved in opposite directions.
4. The heat exchanger arrangement according to claim 2, wherein the blades (SC) of the radial fan (RL) are formed with a constant curvature along and parallel to their vertical axis (HS).
5. The heat exchanger arrangement according to claim 2, wherein the fins (LA) of the guide arrangement (NL) are formed with a constant curvature along and parallel to their vertical axis (HL).
6. The heat exchanger arrangement according to claim 2, wherein inwardly tapering regions are formed between the fins (LA) so that the air flow experiences an inward pressure increase.
7. The heat exchanger arrangement according to claim 1, wherein the reverse-operated radial fan (RL) and the guide arrangement (NL) cover at least in portions along the axis of rotation (RA) of the radial fan (RL).
8. The heat exchanger arrangement according to claim 1, wherein the air inlet opening (ZO) is arranged in a sidewall (SW) of the housing (GE) that surrounds a free-standing air heat exchanger (LT).
9. The heat exchanger arrangement according to claim 1, wherein the reverse-operated radial fan (RL) is driven by means of an electric motor (EM).

* * * * *